United States Patent [19]

Hasegawa

[11] Patent Number: 5,317,466
[45] Date of Patent: May 31, 1994

[54] MAGNETIC HEAD DRUM APPARATUS HAVING UPPER AND LOWER STATIONARY DRUMS AND A ROTATABLE MEMBER THEREBETWEEN ARRANGED TO DAMP NOISE AND VIBRATION

[75] Inventor: Shinichi Hasegawa, Chiba, Japan

[73] Assignee: Sony Corporation, Tokyo, Japan

[21] Appl. No.: 855,585

[22] Filed: Mar. 23, 1992

[30] Foreign Application Priority Data

Apr. 1, 1991 [JP] Japan .................................. 3-068129

[51] Int. Cl.$^5$ ........................ G11B 5/52; G11B 15/61; G11B 21/04; G11B 21/18
[52] U.S. Cl. ...................................... 360/107; 360/84; 360/130.24
[58] Field of Search ............ 360/107, 108, 84, 130.24, 360/130.23, 130.22

[56] References Cited

U.S. PATENT DOCUMENTS

| 4,564,876 | 1/1986 | Takashi et al. ...................... 360/107 |
| 4,641,214 | 2/1987 | Imanishi et al. ................. 360/130.24 |
| 4,875,110 | 10/1989 | Kazama et al. ...................... 360/64 |
| 5,119,257 | 6/1992 | Itou et al. ........................ 360/130.24 |

FOREIGN PATENT DOCUMENTS

| 62-281113 | 12/1987 | Japan .............................. 360/130.24 |
| 3-225614 | 10/1991 | Japan .............................. 360/130.24 |
| 2134308 | 8/1984 | United Kingdom . |
| 2211343 | 6/1989 | United Kingdom . |

Primary Examiner—Stuart S. Levy
Assistant Examiner—Craig A. Renner
Attorney, Agent, or Firm—William S. Frommer; Alvin Sinderbrand

[57] ABSTRACT

A magnetic head drum of a helical-scan type for video data recording and reading apparatus comprises upper and lower stationary drums securely mounted on a spindle, an intermediate member rotatably supported on the spindle between the drums, and a motor for rotating the intermediate member. The motor comprises a rotor secured to the intermediate member, a stator secured to the upper drum, and a back yoke connected with the rotor through a back yoke retainer such that the stator is interposed between the rotor and the back yoke. This arrangement of the magnetic head drum contributes to effective damping of an electromagnetic noise of the motor caused due to vibration of the stator and back yoke.

5 Claims, 3 Drawing Sheets

MAGNETIC HEAD DRUM APPARATUS HAVING UPPER AND LOWER STATIONARY DRUMS AND A ROTATABLE MEMBER THEREBETWEEN ARRANGED TO DAMP NOISE AND VIBRATION

BACKGROUND OF THE INVENTION

The present invention relates to a magnetic head drum of a helical-scan type for magnetically recording and reading video data on a magnetic tape.

Such a magnetic head drum known in the art comprises a stationary spindle, a stationary drum secured to the spindle, a rotary drum rotatably supported on the spindle by bearings, and a motor for rotating the rotary drum. The stationary drum has a cylindrical side wall formed on its outer circumferential face with a helical guide shoulder for helically guiding a magnetic tape thereon. The rotary drum also has a cylindrical side wall which is disposed in circumferentially aligned relationship with the stationary drum and provided at its outer periphery with a magnetic head for recording and reading video signals on the magnetic tape. At an inner circumferential face of the cylindrical side wall of the rotary drum is provided a damping yoke made of a laminated plate including steel films and a resin layer interposed therebetween. The motor comprises a rotor secured to the rotary drum and a stator secured to the spindle being remote at a predetermined distance from the rotor. The stationary drum also is provided with a transformer for the stator which is arranged so as to be opposed to a transformer for the rotor disposed on the rotor side. Further, the stator is provided, at its circumferential edge, with a cylindrical damper in order to restrain vibration of the stator upon rotation of the rotary drum. The vibration causes a noise, viz, electromagnetic noise of the motor.

However, upon rotation of the rotary drum, neither the damping yoke nor the stator with the damper is effectively released from the vibration. As a result, the electromagnetic noise is still generated.

There is a great demand for a magnetic head drum rotatable at high speed without generating the electromagnetic noise and suitable for an apparatus such as a digital video tape recorder.

SUMMARY OF THE INVENTION

A principal object of the present invention is to provide a magnetic head drum of a damping structure for damping an electromagnetic noise generated upon rotation of the magnetic head drum.

Accordingly, the present invention provides a magnetic head drum for video data recording and reading apparatus, comprising:

a lower drum having a central bore into which a spindle is securely fitted, an upper drum securely mounted on the spindle, an intermediate member rotatably supported on the spindle between the lower drum and the upper drum, a magnetic head mounted on an outer periphery of the intermediate member, and a motor for rotating the intermediate member around the spindle. The motor has a stator securely mounted on the upper drum, a rotor securely mounted on the intermediate member, and a back yoke connected with the rotor through a back yoke retainer disposed on the rotor. The stator is interposed between the rotor and the back yoke.

DESCRIPTION OF THE PREFERRED EMBODIMENT

Figure 1:
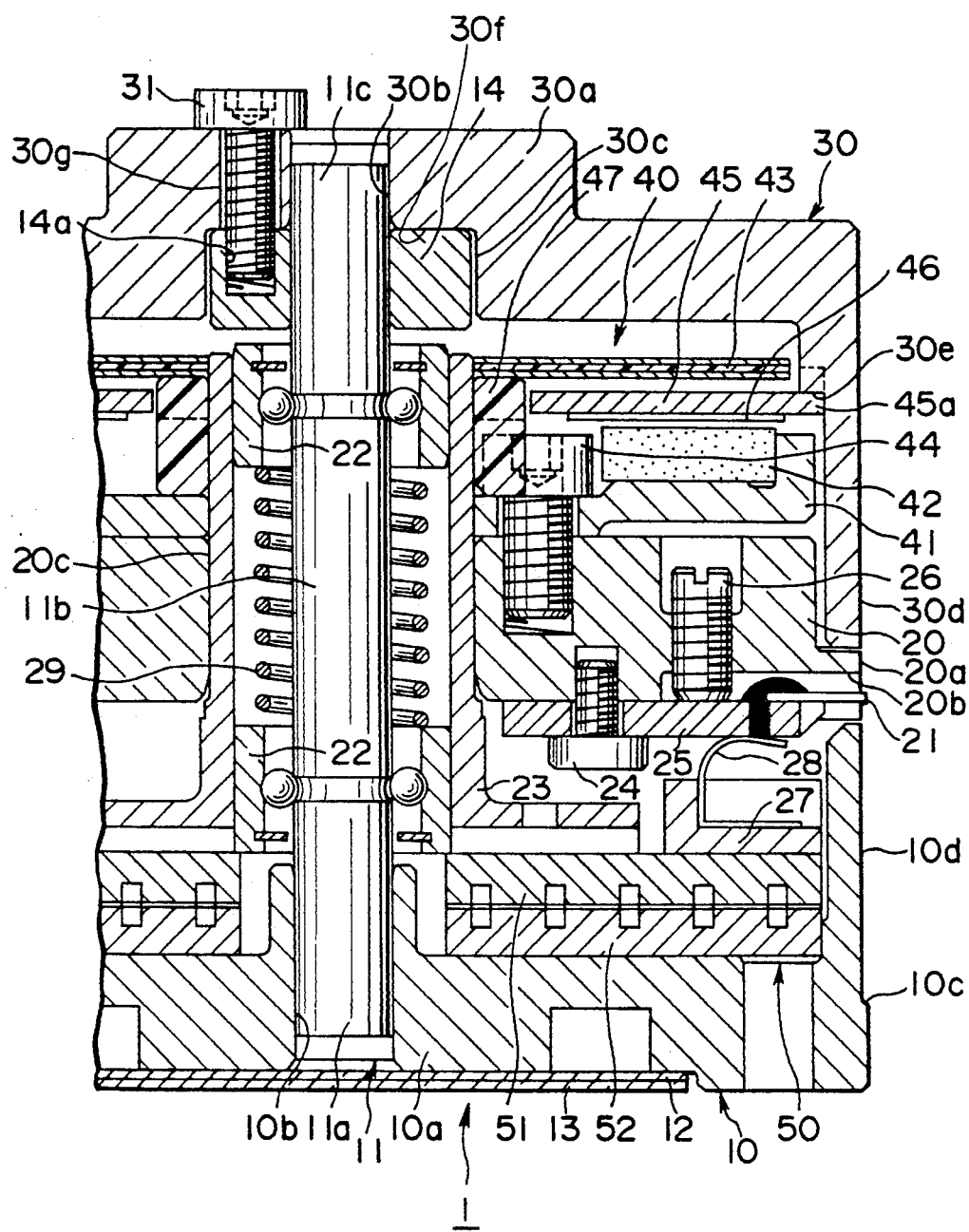
FIG. 1 is a sectional view of a magnetic head drum of a first embodiment according to the present invention.

Referring now to FIG. 1, a magnetic head drum 1 according to the present invention comprises a stationary spindle 11, cylindrical lower and upper stationary drums 10 and 30 and a cylindrical intermediate member 20 interposed between the stationary drums 10 and 30.

The lower stationary drum 10 has a disk-like bottom wall 10a and a cylindrical side wall uprightly extending from an outer periphery of the bottom wall 10a along the stationary spindle 11. The bottom wall has a cylindrical central opening 10b into which an end 11a of the stationary spindle 11 is press-fitted. The cylindrical side wall has on an outer circumferential face 10d thereof a helical guide shoulder 10c for helically guiding a magnetic tape (not shown) thereon. A pair of annular ball bearings 22, 22 are mounted on the stationary spindle 11 in spaced relationship with each other. A coil spring 29 is mounted on a mid-portion 11b between the ball brearings 22, 22, in order to prevent the ball bearings 22, 22 from dislocating on the stationary spindle 11. A flanged sleeve 23 is secured on the ball bearings 22, 22 so that the sleeve 23 is rotatably disposed on the stationary spindle 11 through the ball bearings 22, 22.

The intermediate member 20 is of a thickened disk shape and has a central opening 20c concentrically formed with the central opening 10b of the lower stationary drum 10. The sleeve 23 rotatably disposed on the stationary spindle 11 is inserted into the central opening 20c of the intermediate member 20 such that the intermediate member 20 is also rotatably supported on the mid-portion 11b of the stationary spindle 11. The intermediate member 20 has a lower face on which a magnetic head-mounting base 25 is fastened by a bolt 24. The base 25 is provided with a magnetic head 21 by such a conventional manner as soldering. The lower face of the intermediate member 20 is formed with a recess 20b in which the magnetic head 21 is received. The intermediate member 20 has a through-hole vertically extending to the recess 20b, into which a screw 26 is fitted. By tightening or untightening the screw 26, a vertical position of the base 25 is adjustable relative to the lower face of the intermediate member 20. The intermediate member 20 may be of a thin disk shape.

The upper stationary drum 30 has a disk-like top wall provided with a central protrudent portion 30a extending outwardly from the top wall along the stationary spindle 11, and a cylindrical side wall extending downwardly from an outer periphery of the top wall in an opposite direction of the protrudent portion 30a. The top wall has a recess 30c formed concentrically with the central opening 20c of the intermediate member 20. The protrudent portion 30a has a central opening 30b formed concentrically with the recess 30c of the top wall. One end 11c of the stationary spindle 11 is press-fitted into the central opening 30b until a top end face of an annular collar 14 mounted on the stationary spindle 11 abuts against a bottom end face 30f of the recess 30c. The upper stationary drum 30 is secured to the collar 14 by screwing a bolt 31 into holes 30g and 14a formed on the protrudent portion 30a and collar 14, respectively. Thus, the collar 14 provides a means for securing the upper stationary drum 30 to the end 11c of the stationary spindle 11 with high accuracy. The collar 14 may be integrally formed with the stationary spindle 11.

Upon assembly, an outer circumferential face 30d of the cylindrical side wall of the upper stationary drum 30 is flush with outer circumferential faces 20a and 10d of the intermediate member 20 and lower stationary drum 10. As a result, dislocation at the outer circumferential face 30d with respect to the outer circumferential faces 10d and 20a is restrained within a narrow range below 1 micron meter. The magnetic tape is helically guided while being contacted with the respective outer circumferential faces 10d, 20a and 30d.

The magnetic head drum 1 further comprises a motor 40 for rotating the intermediate member 20, which includes a flanged annular disk-like rotor 41 and an annular disk-like stator 45. The rotor 41 is secured on an upper face of the intermediate member 20 by a bolt 44 and provided with an annular magnet 42 fixed on an upper face thereof in such a manner that an outer periphery of the magnet abuts against the flanged portion of the rotor 41. A back yoke retainer 47 made of a damping material such as polyester elastomer, rubber or the like is disposed on an inner periphery of the upper face of the rotor 41 while being securely fitted onto an upper end of the sleeve 23. A back yoke 43 is supported on a top end face of the back yoke retainer 47 such that a lower face of the back yoke 43 is opposed to an upper face of the stator 45. Accordingly, the back yoke 43 rotates together with the rotor 41. The back yoke 43 is made of a laminated plate including steel films and a resin layer interposed therebetween and serves for damping vibration caused due to the rotation, in cooperation with the back yoke retainer 47.

The stator 45 has an outer circumferential edge 45a where the stator 45 is secured by an adhesive to a stepped portion 30e which is formed on an inner circumferential face of the cylindrical side wall of the upper stationary drum 30. The stator 45 is provided, on its lower face, with a coil 46 spaced at a predetermined distance from the magnet 42 on the rotor 41.

Between the lower stationary drum 10 and the intermediate member 20 is disposed a transformer unit 50 comprising a transformer 51 for the rotor 41 and a transformer 52 for the stator 45. The transformer 52 is mounted on an upper face of the bottom wall 10a. A flexible circuit board 13 for the transformer unit 50 is secured on an lower face of the bottom wall 10a through a terminal plate 12 by a plurality of pins (not shown). On the other hand, the transformer 51 is attached by an adhesive to a lower face of the flanged portion of the sleeve 23 so as to be spaced at a predetermined distance from the transformer 52. The transformer 51 is provided, on its upper face, with a terminal plate 27 having an elastic deformable contact 28 through which the transformer 51 are electrically connected to the magnetic head 21. A lead wire, such as a harness, for the motor 40 is derived outside from a hole or notch (not shown) formed in the protrudent portion 30a of the upper stationary drum 30.

Upon assembly, firstly the back yoke retainer 47 mounting the back yoke 43 is placed in the upper stationary drum 30 which is in an upset state with its protrudent side facing downward. Subsequently, the outer circumferential edge 45a of the stator 45 is attached to the stepped portion 30e of the upper stationary drum 30. Thus, an upper unit-like structure including the upper stationary drum 30, the back yoke 43, the back yoke retainer 47 and the stator 45 is preliminarily assembled. Second, the intermediate member 20 mounting the rotor 41 and the magnetic head 21, and then the upper stationary drum 30 are in turn mounted on the stationary spindle 11 which is fitted to the lower stationary drum 10.

Figure 2:
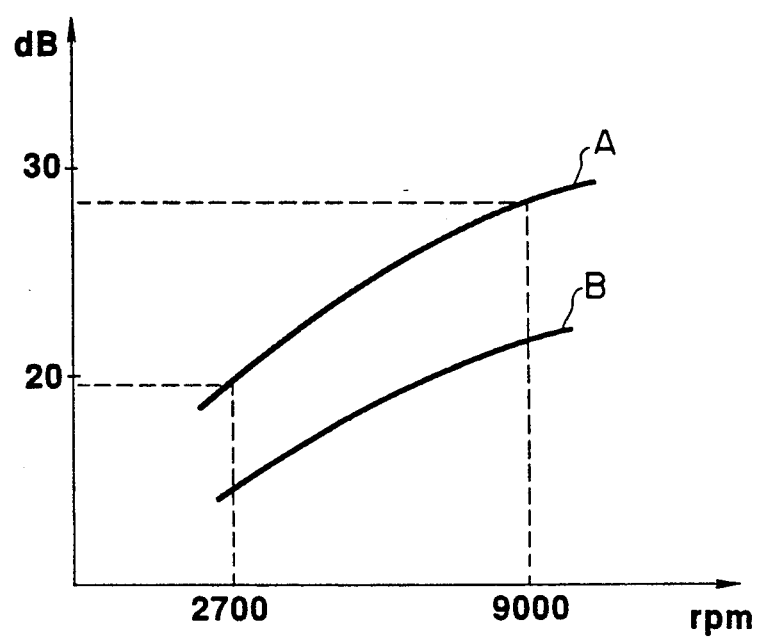
FIG. 2 is a graph showing a relationship between electromagnetic noise and r.p.m. (revolutions per minute) of a motor used in the magnetic head drum.

The magnetic head drum 1 according to the present invention contributes to damping the vibration of the stator 45 caused due to rotation of the rotor 41. Accordingly, a noise resulting from the vibration of the stator 45 is considerably restrained as indicated in a graph of FIG. 2, in which a noise generated by the magnetic head drum of the present invention is indicated by line B while that generated by a conventional magnetic head drum is indicated by line A. Referring to FIG. 2, it is noted that, over the range where revolutions per minute of the motor 40 changes from 2,700 to 9,000, the noise in the magnetic head drum of the present invention is maintained lower by approximately 5 dB than that in the conventional magnetic head drum.

Figure 3:
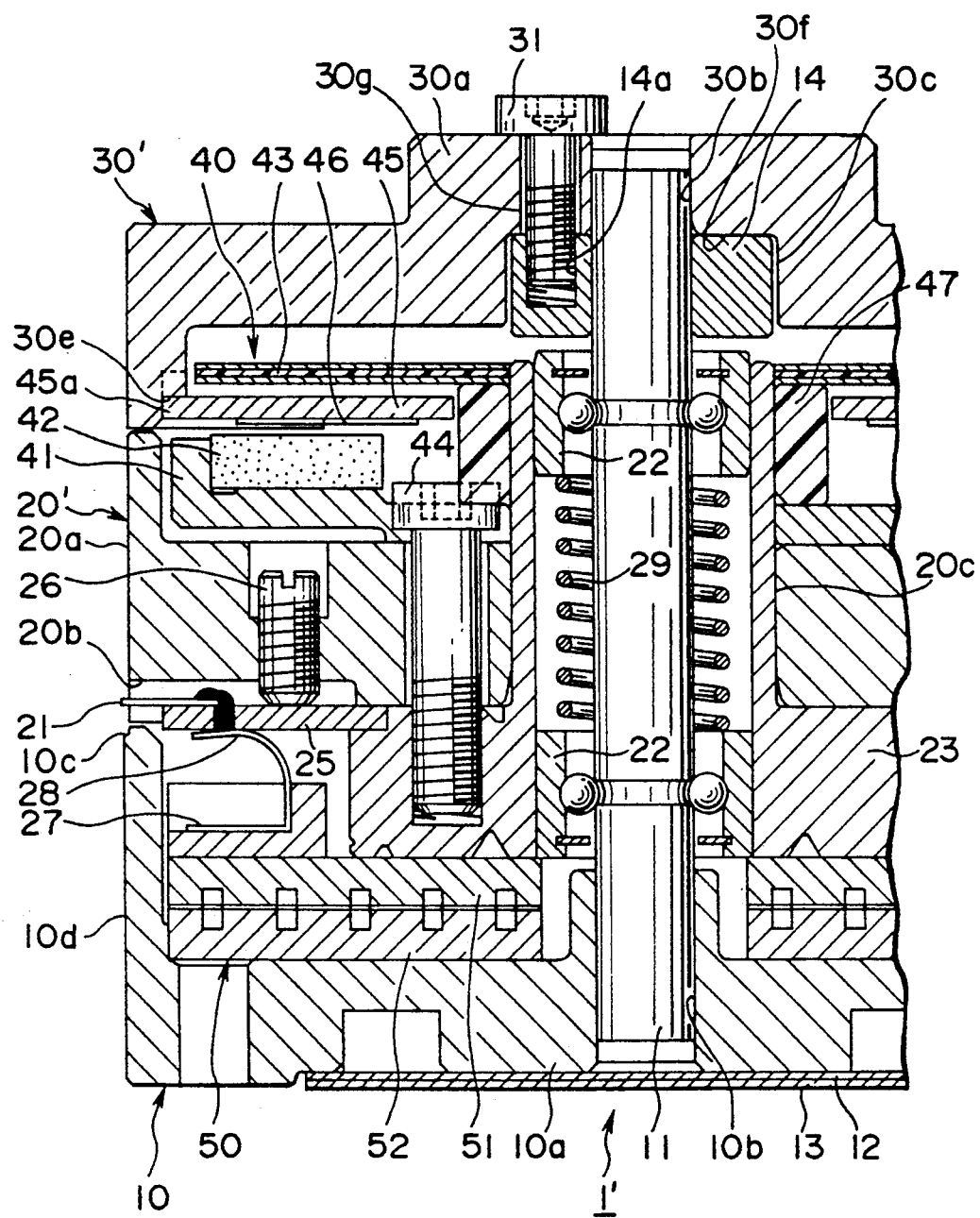
FIG. 3 is a sectional view of a magnetic head drum of a second embodiment according to the present invention.

Another preferred embodiment of a magnetic head drum according to the present invention will be described hereinafter with reference to FIG. 3 in which like numerals indicate like parts of the magnetic head drum of the aforementioned first embodiment, and therefore detailed explanations thereof are omitted. Referring to FIG. 3, a magnetic head drum 1' includes a cylindrical intermediate member 20' having a bottom wall and a cylindrical upper stationary drum 30' having a top wall. The intermediate member 20' also has a cylindrical side wall extending uprightly from an outer periphery of the bottom wall so as to be substantially flush with a top end face of a magnet 42 on a rotor 41. The upper stationary drum 30' also has a cylindrical side wall extending from an outer periphery of the top wall so as to be opposed to a top end of the cylindrical side wall of the intermediate member 20'. The upper stationary drum 30' is formed with a stepped portion 30e to which an outer circumferential edge 45a of a stator 45 is fitted, near a bottom end of the cylindrical side wall of the upper stationary drum 30'. A magnetic tape is helically guided while being contacted with outer circumferential faces 10d and 20a of a lower stationary drum 10 and the intermediate member 20'.

As is similar to the magnetic head drum of the first embodiment, a noise generated by vibration of the stator 45 used in the magnetic head drum 1' is restrained.

What is claimed is:

1. A magnetic head drum apparatus for a video data recording and reading device, said apparatus comprising:
   a spindle,
   a first drum having a central bore into which said spindle is securely fitted,
   a second drum securely mounted on said spindle,
   an intermediate member rotatably supported on said spindle between said first and second drums,
   a magnetic head coupled to an outer periphery of said intermediate member,
   a back yoke retainer formed of a rubber-like material and being rotatably supported on said spindle,
   a back yoke rotatably supported by said back yoke retainer and formed from a laminated plate having a plurality of layers in which one of said layers is formed of a resin-like material, and a motor for rotating said intermediate member, said magnetic head, said back yoke retainer and said back yoke around said spindle, said motor having a rotor securely mounted on said intermediate and coupled to said back yoke by way of said back yoke retainer, and a stator securely mounted on said second drum and being interposed between said rotor and said back yoke.

2. A magnetic head drum apparatus as in claim 1, wherein said apparatus has a helical guide path for helically guiding a magnetic tape on an outer circumferential face thereof.

3. A magnetic head drum apparatus as in claim 1, wherein said intermediate member has a cylindrical shape.

4. A magnetic head drum apparatus as in claim 1, wherein said intermediate member has a disk shape.

5. A magnetic head drum apparatus as in claim 1, wherein said spindle is press-fitted into said second drum.

* * * * *